United States Patent
Doi et al.

(10) Patent No.: US 10,190,899 B2
(45) Date of Patent: Jan. 29, 2019

(54) THERMAL FLOW SENSOR

(71) Applicant: Hitachi Automotive Systems, Ltd., Hitachinaka-shi, Ibaraki (JP)

(72) Inventors: Ryosuke Doi, Hitachinaka (JP); Shinobu Tashiro, Hitachinaka (JP); Kazunori Suzuki, Hitachinaka (JP); Masahiro Matsumoto, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 237 days.

(21) Appl. No.: 14/914,709

(22) PCT Filed: Feb. 3, 2014

(86) PCT No.: PCT/JP2014/052381
§ 371 (c)(1),
(2) Date: Feb. 26, 2016

(87) PCT Pub. No.: WO2015/029459
PCT Pub. Date: Mar. 5, 2015

(65) Prior Publication Data
US 2016/0209255 A1    Jul. 21, 2016

(30) Foreign Application Priority Data
Sep. 2, 2013 (JP) ................................ 2013-180852

(51) Int. Cl.
*G01F 1/692* (2006.01)
*G01F 1/68* (2006.01)
(Continued)

(52) U.S. Cl.
CPC ............... *G01F 1/692* (2013.01); *G01F 1/68* (2013.01); *G01F 1/696* (2013.01); *G01F 1/72* (2013.01); *G01F 5/00* (2013.01)

(58) Field of Classification Search
CPC .................................. G01F 1/692; G01F 1/68
See application file for complete search history.

(56) References Cited

U.S. PATENT DOCUMENTS 5,635,635 A    6/1997  Tsukada et al.
6,672,146 B1   1/2004  Kobayashi et al.
(Continued)

FOREIGN PATENT DOCUMENTS

EP    0 902 261 A1    3/1999
EP    0 961 105 A1    12/1999
(Continued)

OTHER PUBLICATIONS

Extended European Search Report issued in counterpart European Application No. 14840664.8 dated Apr. 12, 2017 (8 pages).
(Continued)

*Primary Examiner* — Marc Armand
(74) *Attorney, Agent, or Firm* — Crowell & Moring LLP

(57) ABSTRACT

A thermal flow sensor with improved measurement accuracy is provided. The thermal flow sensor includes: an air flow rate detection element with a diaphragm having a thin-film portion in a semiconductor substrate; at least one heat generating resistor on the diaphragm; at least one temperature measuring resistor that detects temperature on each of an upstream side and a downstream side of the heat generating resistor; and a correction circuit portion that processes an output signal of the air flow rate detection element on the basis of temperature difference information of at least the two temperature measuring resistors on the upstream side and the downstream side, wherein a waveform of the output signal processed by the correction circuit portion is a waveform obtained by cutting a part of a mountain part or a valley part constituting a peak value by outputting of an arbitrary
(Continued)

predetermined value when the peak value of the waveform exceeds the arbitrary predetermined value.

6 Claims, 16 Drawing Sheets

(51) Int. Cl.
*G01F 1/696* (2006.01)
*G01F 1/72* (2006.01)
*G01F 5/00* (2006.01)

(56) References Cited

U.S. PATENT DOCUMENTS

| | | |
|---|---|---|
| 7,177,770 B1 | 2/2007 | Hocken et al. |
| 2005/0109085 A1 | 5/2005 | Suetake et al. |
| 2006/0037390 A1 | 2/2006 | Nakano et al. |
| 2010/0095761 A1 | 4/2010 | Ariyoshi et al. |
| 2011/0257898 A1* | 10/2011 | Ooishi ............... G01F 1/6845 702/23 |
| 2012/0291533 A1 | 11/2012 | Kitahara |
| 2013/0199280 A1 | 8/2013 | Nakano et al. |
| 2015/0141774 A1* | 5/2015 | Ogawa ............... A61C 17/22 600/301 |

FOREIGN PATENT DOCUMENTS

| | | |
|---|---|---|
| JP | 7-234143 A | 9/1995 |
| JP | 11-83584 A | 3/1999 |
| JP | 2006-58078 A | 3/2006 |
| JP | 2012-32247 A | 2/2012 |
| JP | 2012-255768 A | 12/2012 |

OTHER PUBLICATIONS

International Search Report (PCT/ISA/210) issued in PCT Application No. PCT/JP2014/052381 dated May 20, 2014 with English translation (Two (2) pages).

European Communication pursuant to Rule 114(2) EPC issued in counterpart European Application No. 14840664.8 dated Aug. 15, 2018 (four (4) pages).

* cited by examiner

FIG. 9
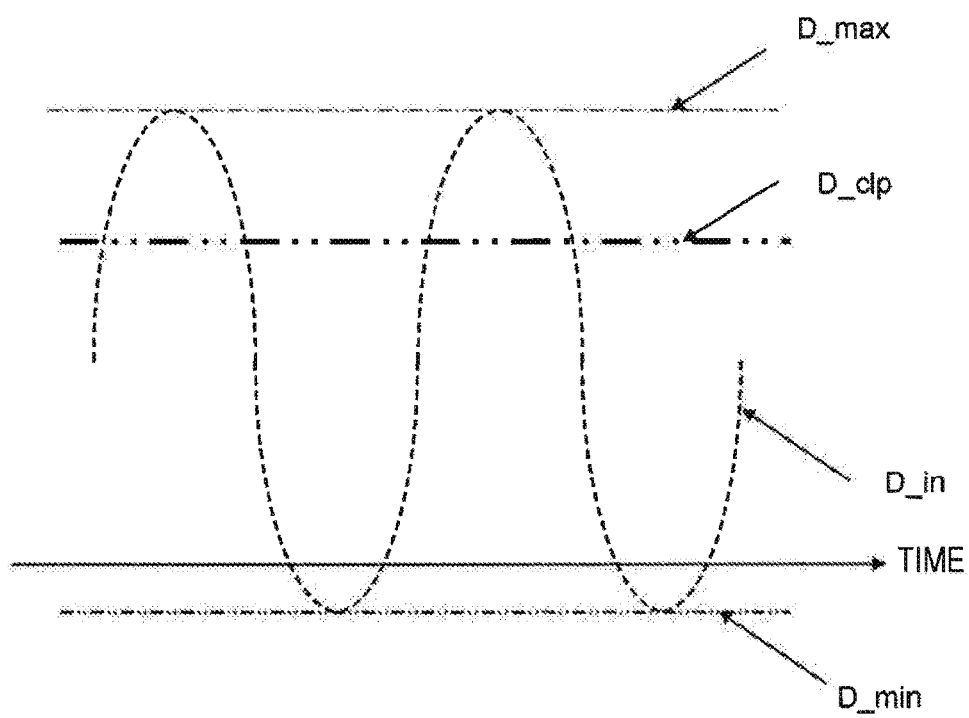
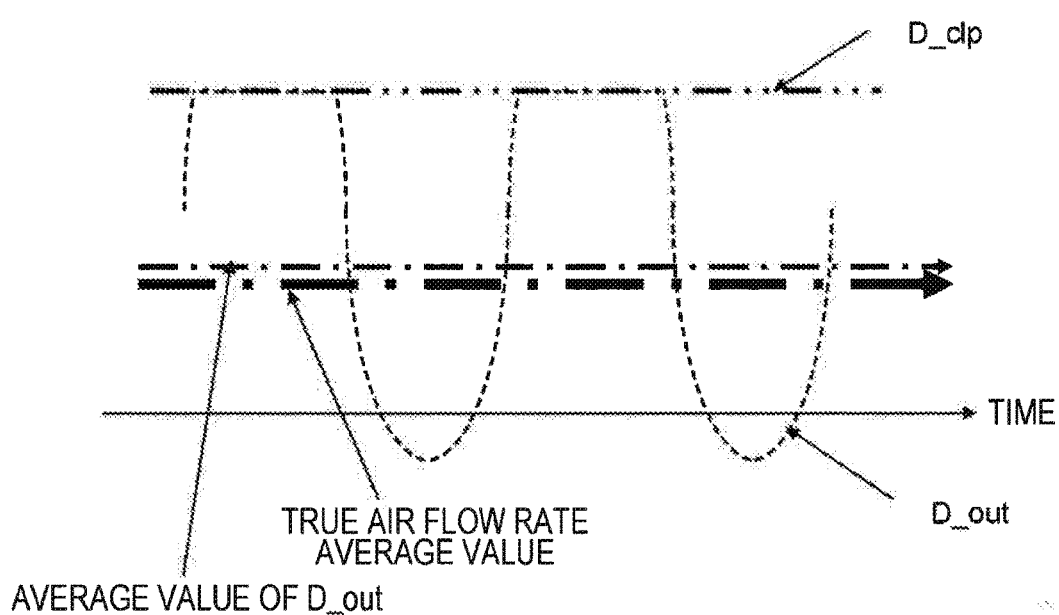

FIG. 15
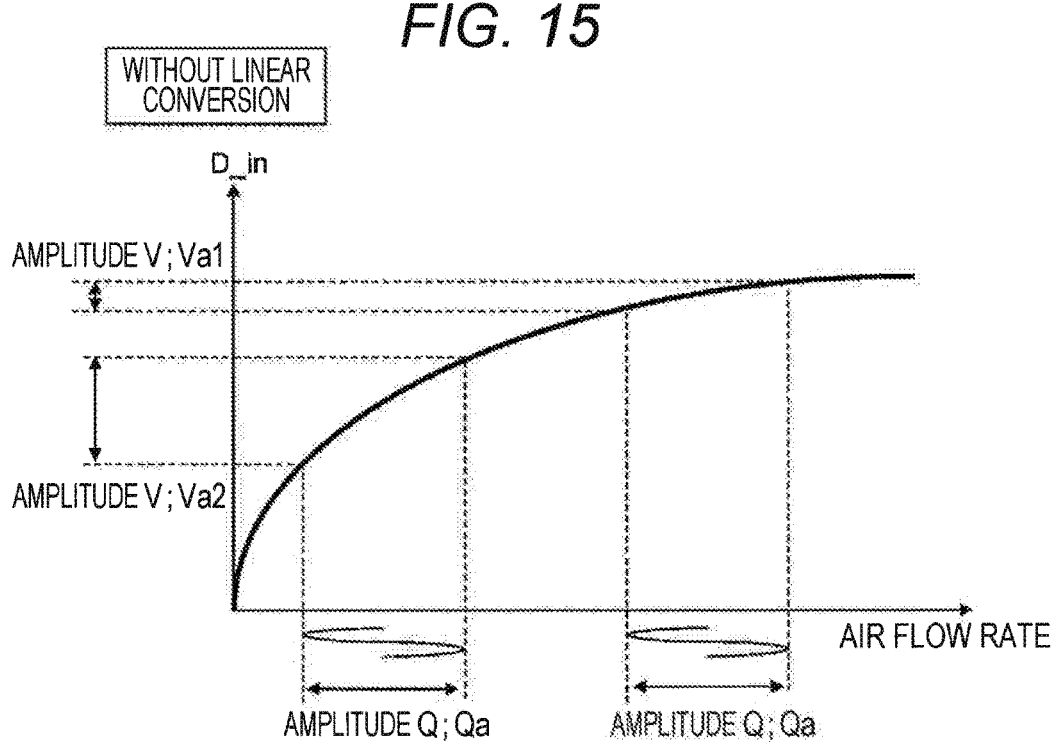
Va1 = Va2
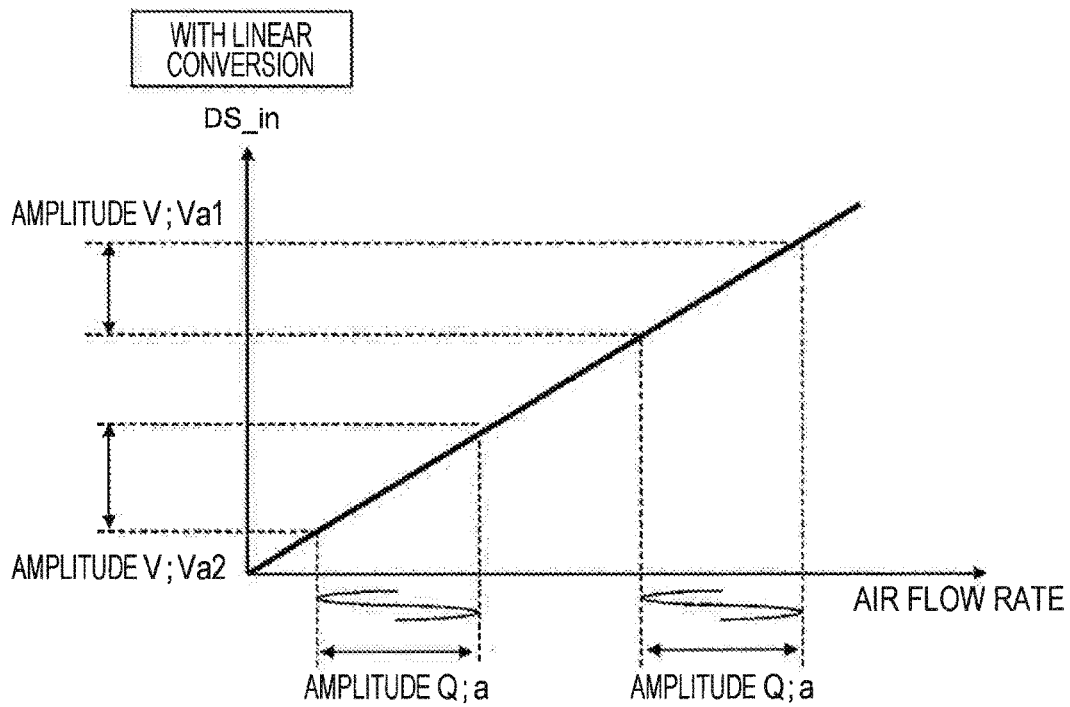
Va1 = Va2

THERMAL FLOW SENSOR

TECHNICAL FIELD

The present invention relates to a thermal flow sensor that measures the air flow rate on the basis of the amount of heat released into the air, particularly to a thermal flow sensor suitably used when measuring the rate of the air flow to be taken in an internal combustion engine of a vehicle.

BACKGROUND ART

As this kind of devices that measure the air flow rate, various structures and types have been practically employed. Along with the sophistication of the engines, higher accuracy for the measurement of the flow rate has been required. In particular, in order to reduce the sensor error in the engine rippling, the backward flow detection method of the flow sensor has been examined. A bobbin type flow sensor typified by the one disclosed in PTL 1 has conventionally been the mainstream but the characteristic of such a flow sensor changes in the positive direction regardless of whether the flow is the forward flow or the backward flow. Therefore, under the rippling condition where the backward flow is caused, the rich error (the error that the average flow rate becomes high) occurs in the bobbin type flow sensor (see FIG. 1).

In contrast to this, the thermal flow sensor that can detect the directions of the forward flow and the backward flow can output the backward flow waveform without being inverted; therefore, the error can be suppressed. Such a thermal flow sensor with a general structure is, as disclosed in PTL 2, the quick responsive flow sensor in which the resistor and the insulating film are provided for the silicon substrate (wafer) through the semiconductor process and the wafer is thinned through the back etching, so that the thermal capacity is suppressed.

CITATION LIST

Patent Literature

PTL 1: JP 11-83584 A
PTL 2: JP 2012-32247 A.

SUMMARY OF INVENTION

Technical Problem

However, a response delay occurs in the flow sensor as disclosed in PTL 2 at the high-frequency rippling over 100 Hz, such as the engine rippling, and the negative error (binarizing phenomenon) (hereinafter referred to as "lean error") as explicitly described in PTL 1 is caused. To deal with this, it has been mainly conducted to design the bypass route structure so as to cancel the lean error with the inertial effect.

In the bypass design, the authors have known that, in the region where the engine rippling with a ripple amplitude of 200% or more occurs (i.e., the ripple condition where the backward flow occurs), if the bypass structure is designed to reduce the error in the region with a ripple amplitude of 200% or less, the backward flow is taken in the bypass route less easily in the occurrence of the backward flow and if the ripple amplitude is as high as 200% or more, the rich error tends to be induced.

That is to say, there is a restriction on the ripple amplitude region where the lean error due to the response delay of the flow sensor and the rich error due to the inertial effect of the bypass route are cancelled. In the recent engine environment representing the VTC engine for the purpose of improving the fuel efficiency, a ripple amplitude of approximately 1000% is generated. The conventional flow sensor has had a problem that there is a particular ripple amplitude condition at which the rich error is large.

An object of the present invention is to provide a thermal flow sensor with higher measurement accuracy.

Solution To Problem

In order to solve the problem, a thermal flow sensor, according to the present invention includes: an air flow rate detection element with a diaphragm having a thin-film portion in a semiconductor substrate; at least one heat generating resistor on the diaphragm; at least one temperature measuring resistor that detects temperature on each of an upstream side and a downstream side of the heat generating resistor; and a correction circuit portion that processes an output signal of the air flow rate detection element on the basis of temperature difference information of at least the two temperature measuring resistors on the upstream side and the downstream side, wherein a waveform of the output signal processed by the correction circuit portion is a waveform obtained by cutting a part of a mountain part or a valley part constituting a peak value by outputting of an arbitrary predetermined value when the peak value of the waveform exceeds the arbitrary predetermined value.

Advantageous Effects Of Invention

According to the present invention, a thermal flow sensor with higher measurement accuracy can be provided.

BRIEF DESCRIPTION. OF DRAWINGS

FIG. 1 is an explanatory view of the rich error in the bobbin type air flow meter.
FIG. 2 is an explanatory view in one embodiment of a thermal flow sensor.
FIG. 3A is an electric wiring diagram of the output voltage of the thermal flow sensor.
FIG. 3B is an explanatory view in one embodiment of the output voltage of the thermal flow sensor.
FIG. 4 is an explanatory view in the case where the thermal flow sensor is mounted in an actual vehicle.
FIG. 5 is an explanatory view of the binarizing error due to the response delay of the element.
FIG. 6 is an explanatory view of the ripple error in the present invention.
FIG. 7 is an explanatory view in one embodiment of a correcting method in the present invention.
FIG. 8 is an explanatory view of the element output waveform before the correction.
FIG. 9 is an explanatory view of the waveform in one embodiment of the correcting method in the present invention.
FIG. 10A is a diagram for describing the relation between the average flow rate and the throttle opening of the actual vehicle.
FIG. 10B is a diagram for describing the relation between the ripple ratio and the throttle opening of the actual vehicle.
FIG. 11 is an explanatory view in one embodiment of the correcting method in the present invention.

FIG. 15 is an explanatory view of the linear conversion correction in the present invention.

DESCRIPTION OF EMBODIMENT

An embodiment of the present invention is hereinafter described

Figure 1:
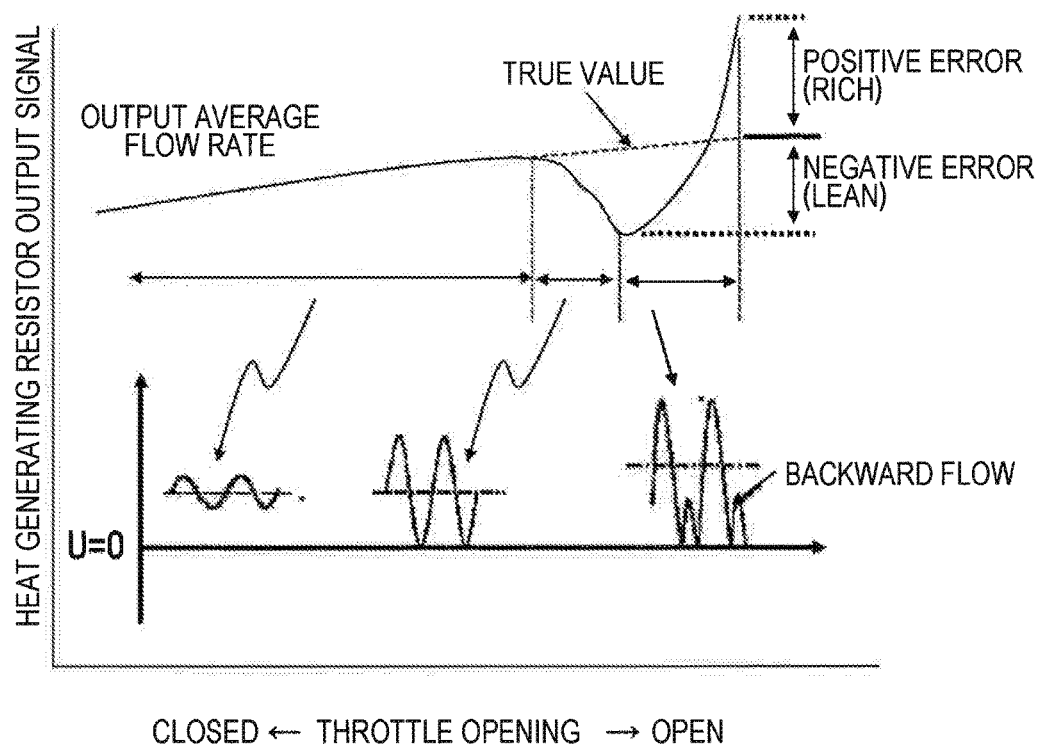
Figure 2:
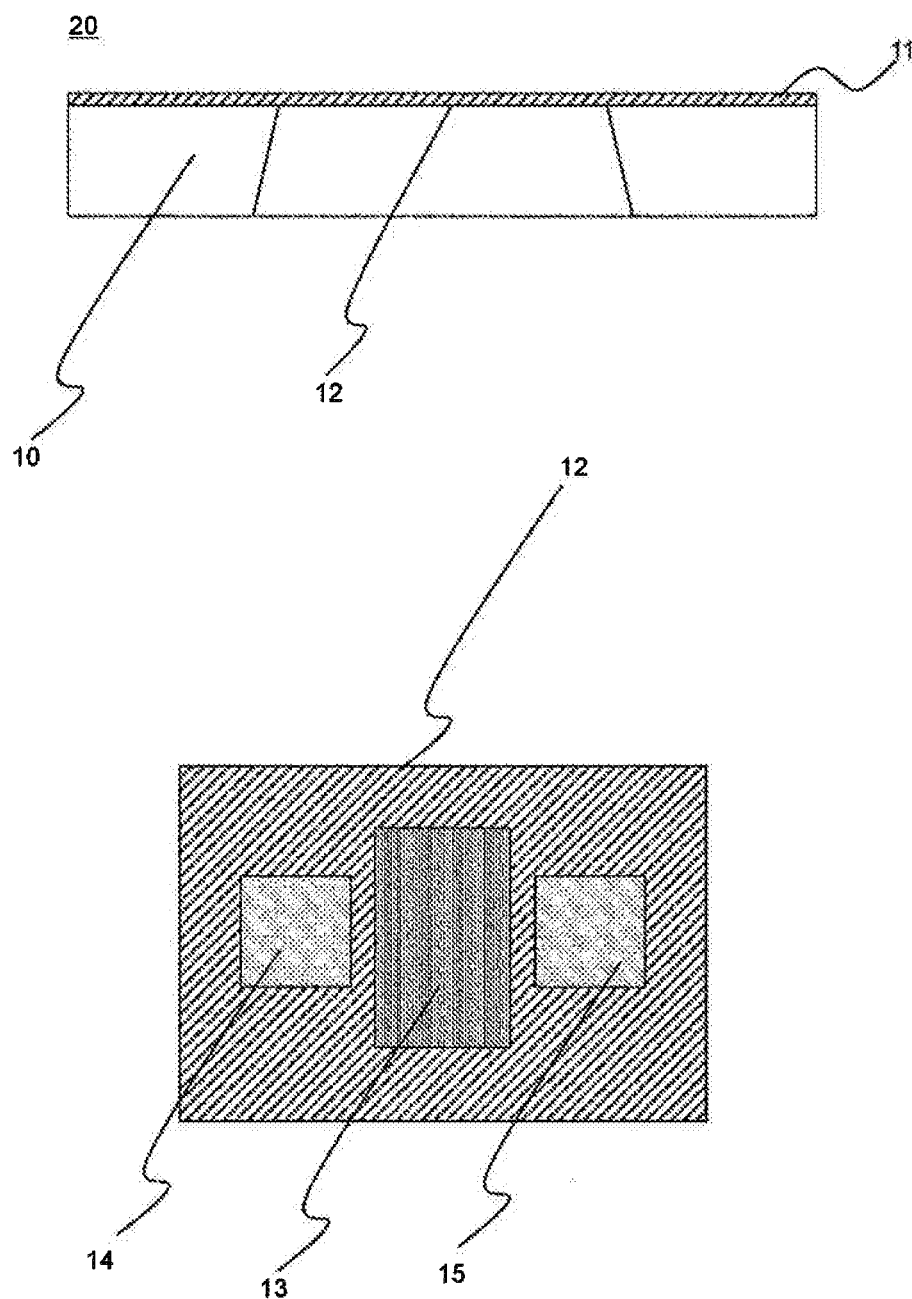
Figure 3A:
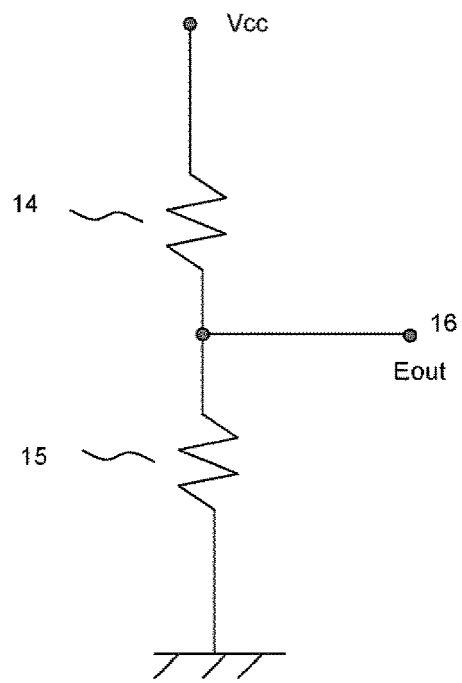
Figure 3B:
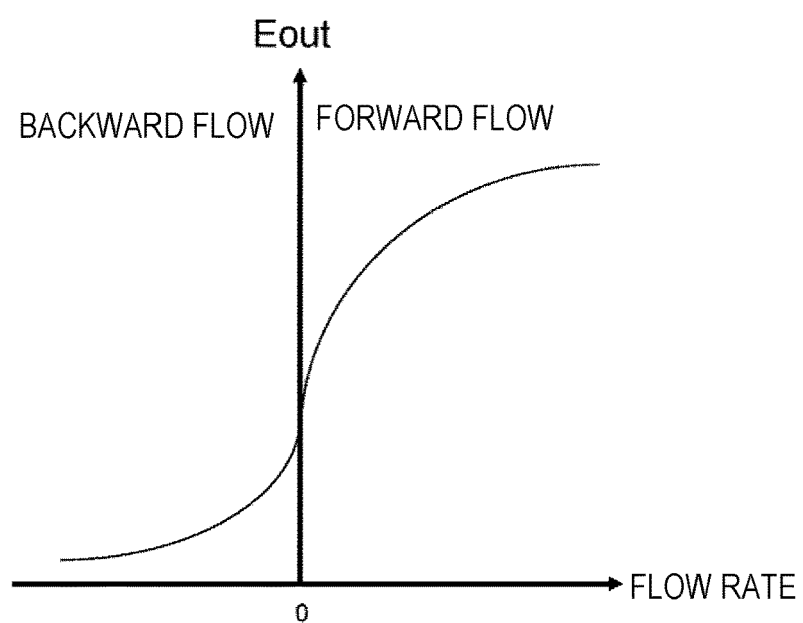

First, the summary of a thermal flow sensor is described. FIG. 2 illustrates a sensing element 20 of the thermal flow sensor. The sensing element 20 is manufactured through a semiconductor technique. A multilayer film 11, which is formed by stacking an insulating film such as an oxide film or a nitride film, and a resistor, is provided for a silicon substrate (wafer) 10, and then the silicon substrate 10 is etched from its back side. This removes the silicon to form a hollow portion. On this occasion, the multilayer film 11 is left as a thin-film portion. This thin-film portion is referred to as a diaphragm 12. On the diaphragm 12, a heater 13 as a heating resistor is disposed at the center. On the upstream side and the downstream side of the heater 13, an upstream side temperature resistor 14 and a downstream side temperature resistor 15 are disposed respectively in a horizontally symmetrical manner with respect to the heater 13. In a normal detection method, the upstream side temperature resistor 14 and the downstream side temperature resistor 15 are connected in series and an intermediate potential (Eout) 16 thereof is extracted as a flow rate signal (see FIG. 3(a)). The relation between the flow rate and Eout is shown in FIG. 3(b).

Figure 4:
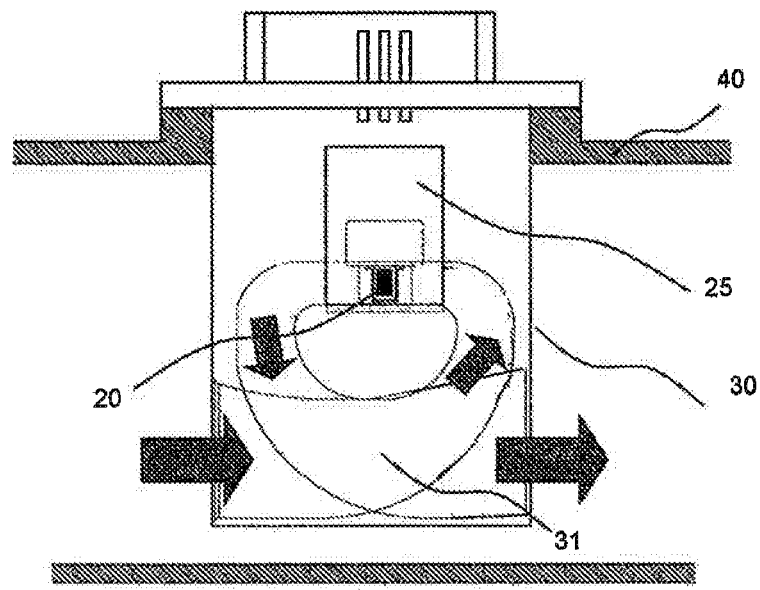

Next, the summary of the thermal flow sensor with the sensing element 20 mounted is shown in FIG. 4 The sensing element 20 is mounted on a support substrate 25. The support substrate 25 is attached to a housing member 30 and has a bypass route 31 along which some air in an air intake duct 40 is guided to the sensing element 20.

Figure 5:
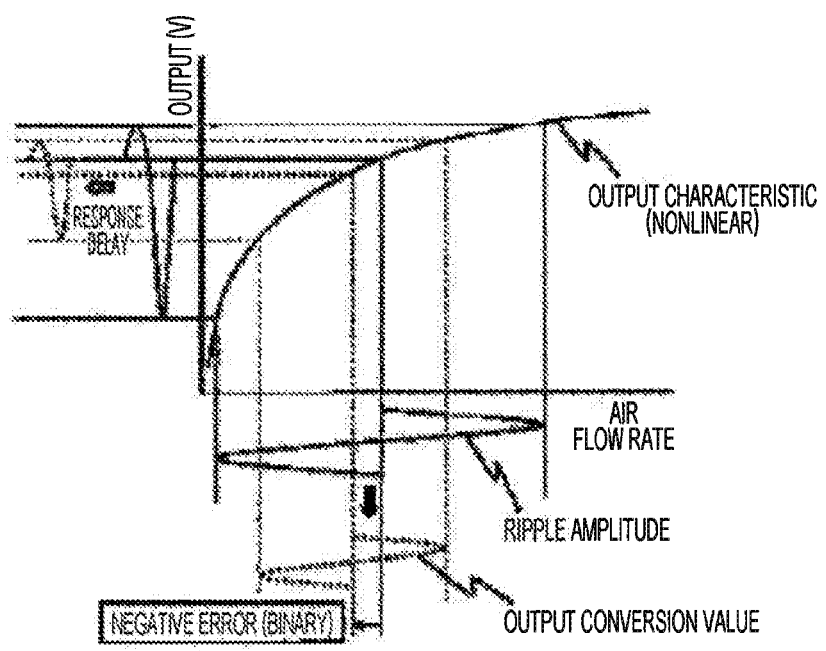

Under such a mount environment, the taken rippling air reaches the thermal flow sensor. The rippling frequency depends on the speed of the engine piston. The rippling flow generally has a frequency of approximately 10 Hz to 200 Hz. Relative to this rippling flow, the response delay occurs in the output from the sensing element 20. In particular, the authors have confirmed that the response delay occurs in the element manufactured through the semiconductor technique when the frequency is approximately 40 Hz or more. In the occurrence of the response delay, the negative error (lean error) occurs because of the nonlinear characteristic between the air flow rate and the output signal (see FIG. 5).

In view of this, in recent years, efforts have been made to improve the lean error caused by the response delay of the thermal flow sensor. As a result, the bypass route 31 for the air flow to make a detour is provided and the flow sensor is disposed in this bypass route 31 as illustrated in FIG. 4. By having the taken air make a detour, the dust and the like included in the taken air are centrifuged so that less dust reaches the sensing element 20. In such a detour bypass route system, the lean error occurs due to the response delay of the flow sensor in the engine rippling when the bypass route does not exist (without bypass) as indicated by the rippling characteristic (error) in FIG. 6. Therefore, for returning the lean error to the zero standard (correcting to the rich side), the inertia of the air flowing in the bypass route is used.

Figure 6:
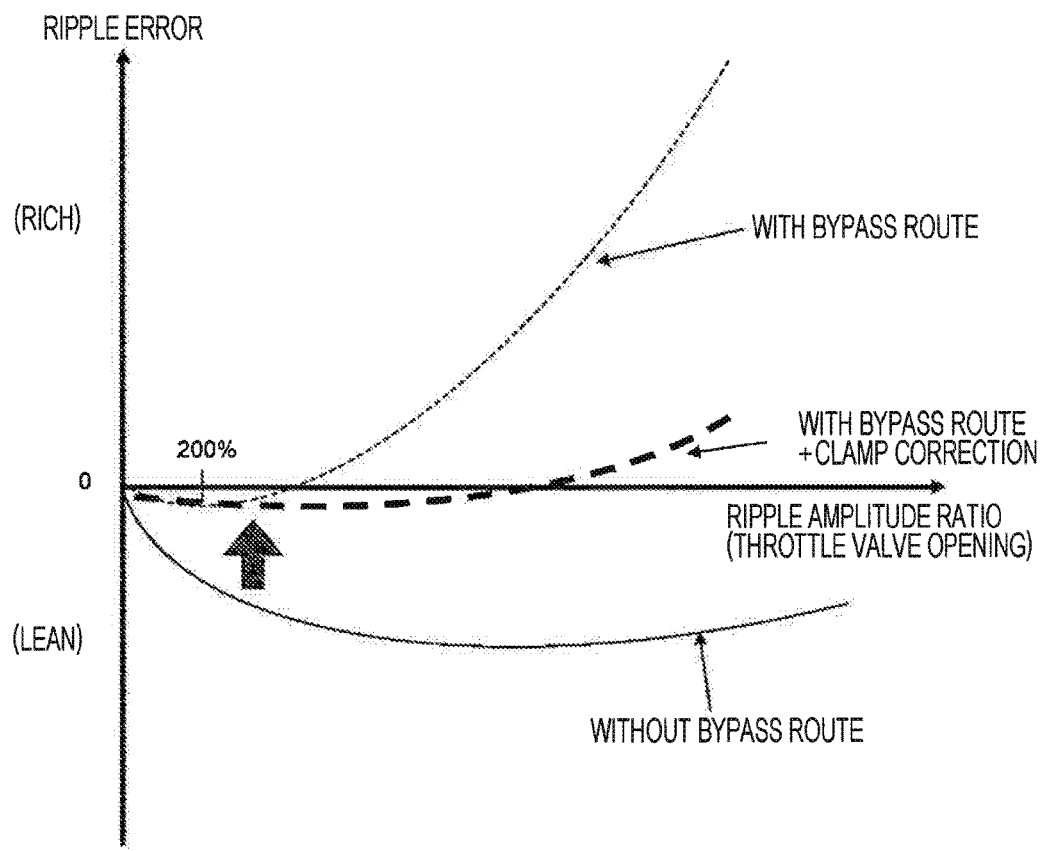

Using the inertial effect of this detour bypass route structure is effective to make the ripple error close to zero in the low ripple amplitude region with a ripple amplitude ratio (200%) or less where the backward flow is caused as illustrated in FIG. 6; however, in the high ripple amplitude region of 200% or more, the rich error tends to appear intensively this time and it is very difficult to cover the regions ranging from the low region to the high region.

EXAMPLE 1

Figure 7:
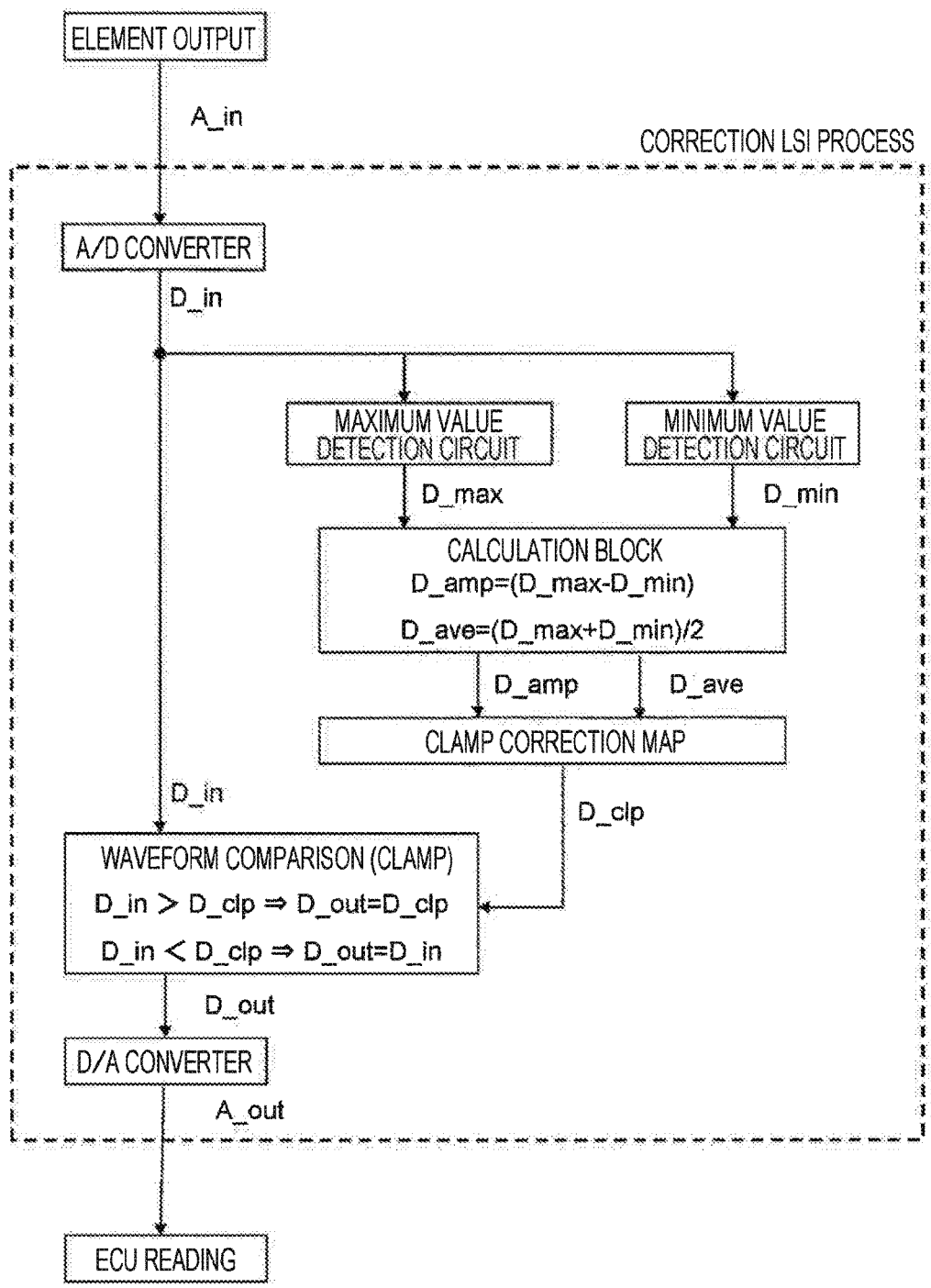

A structure example of a correcting means according to the present invention is illustrated in FIG. 7. The element output from the sensing element 20 is taken into a correction LSI and subjected to A/D conversion in an A/D converter inside (D_in). This input value travels through a maximum value detection circuit and a minimum value detection circuit to be recognized as D_max and D_min, respectively. The two output values are calculated as the values of the average flow rate (D_ave) and the flow amplitude (D_amp) in calculation blocks. A correction clamp value (D_clp) with these two output values used as parameters is selected by a clamp correction map. By comparing and calculating the correction clamp value (D_clp) and the original input value (D_in), it is possible to set so that the original input value does not exceed the correction clamp value. That is to say, when the original input value (D_in) does not exceed the correction clamp value (D_clp) as a result of comparing the original input value (D_in) and the correction clamp value (D_clp), the original input value (D_in) is output as the value (D_out) compared and calculated in the waveform comparison. On the other hand, when the original input value (D_in) exceeds the correction clamp value (D_clp), the correction clamp value (D_clp) is output as the value (D_out) compared and calculated in the waveform comparison. When the input value is more than an arbitrary predetermined value (here, corresponding to the correction clamp value), the arbitrary predetermined value is output and the predetermined value is set to be the maximum value (or minimum value) of the amplitude of the waveform. In this case, cutting the mountain (or valley) of the output waveform at an arbitrary predetermined value is hereinafter called clamp, and such correction is called clamp correction.

The compared and calculated value (D_out) is subjected to the D/A conversion, output as the output signal of the flow sensor, and read by ECU.

Figure 8:
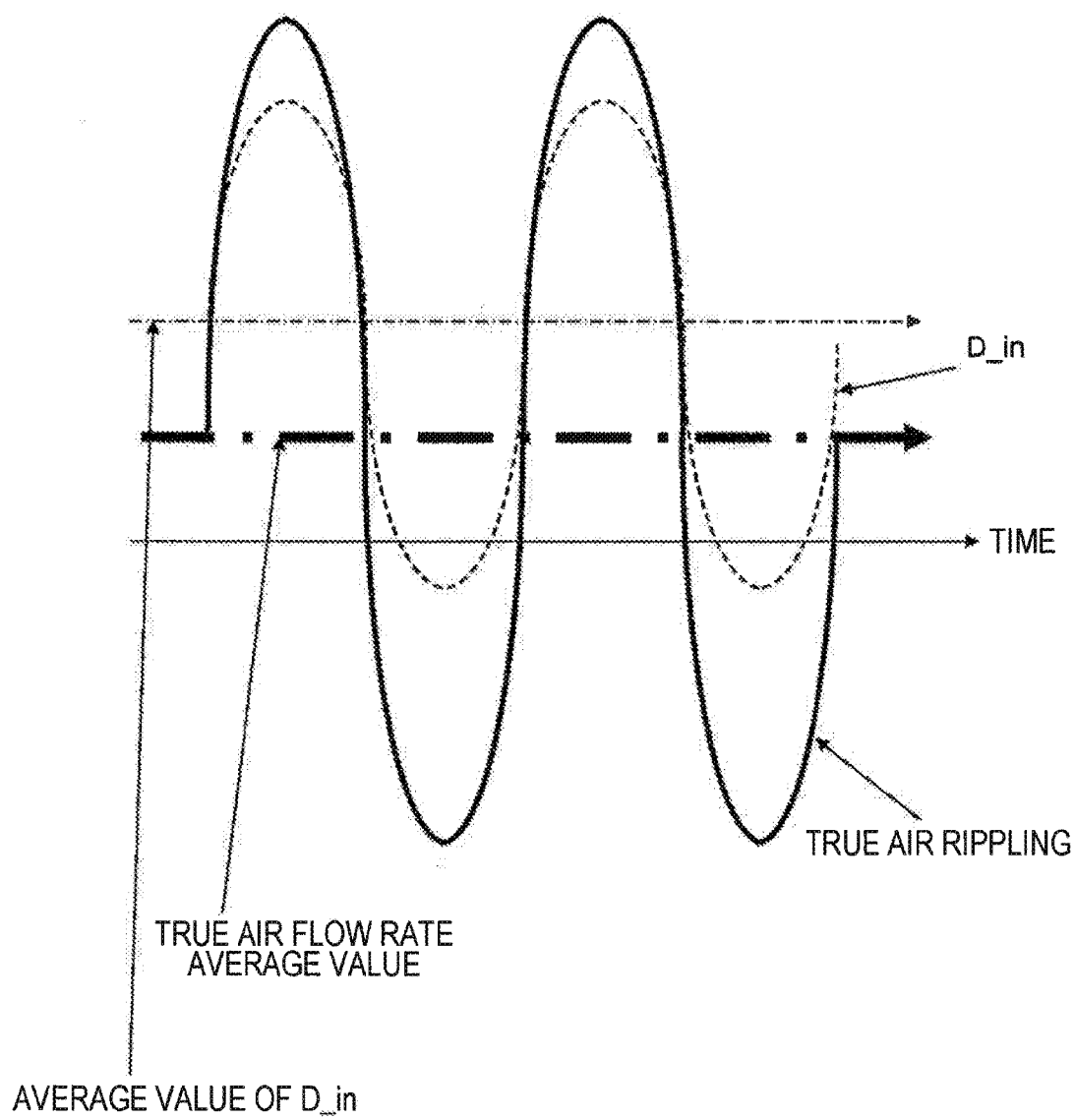

Next, description is made of the effect of the aforementioned correcting means, with reference to FIG. 8 and FIG. 9. FIG. 8 illustrates the state where the ripple amplitude ratio is 200% or more (ripple amplitude ranges to the backward flow region). The solid line in FIG. 8 represents the actual rippling waveform in the air intake duct, and the average value (thick dashed line) represents the true value. On the other hand, the values obtained by having the element output of the flow sensor subjected to the A/C conversion constitute the dotted waveform of D_in in FIG. 8. In this dotted waveform, the response delay occurs relative to the true air rippling and the amplitude becomes smaller and moreover, due to the inertial effect of the detour along the bypass route, the overall average value has shifted largely to the positive error direction. Thus, the average value of D_in (thin dashed line) exhibits the rich error as the ripple error.

On the other hand, the case of conducting the correction inside the LSI is described with reference to FIG. 9. Relative to the input value D_in, the D_max and D_min are recognized in the maximum value and minimum value detection circuits, respectively. Based on these values, the values of the average flow rate (D_ave) and flow amplitude (D_amp) are calculated and a certain correction clamp value (D_clp) is selected from the clamp correction map inside the LSI. After that, the D_in and D_clp are compared and calculated to provide the D_out output. As illustrated in FIG. 9, the average value of D_out here is obtained by cutting the upper part of the waveform, so that the average value becomes smaller and is made closer to the true air average flow rate value. As a result, the highly accurate thermal flow sensor with smaller error can be provided. The values obtained by the maximum value and minimum value detection circuits are updated or attenuated at every certain time.

Figure 16A:
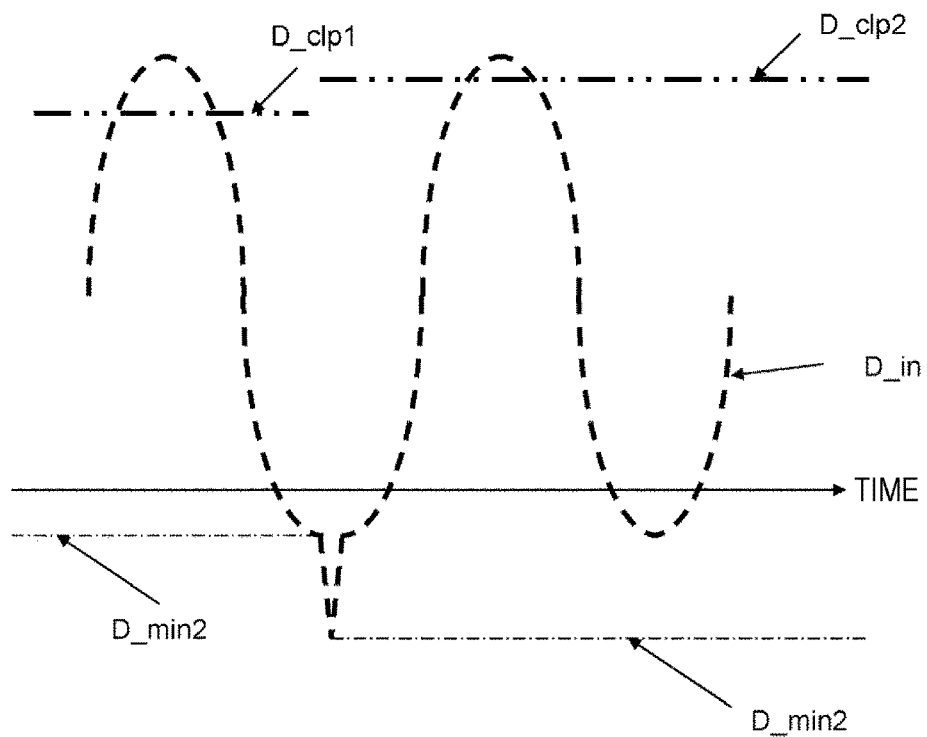
FIG. 16A is a diagram for describing how the clamp correction value is changed before and after the noise is mixed in the input waveform.
Figure 16B:
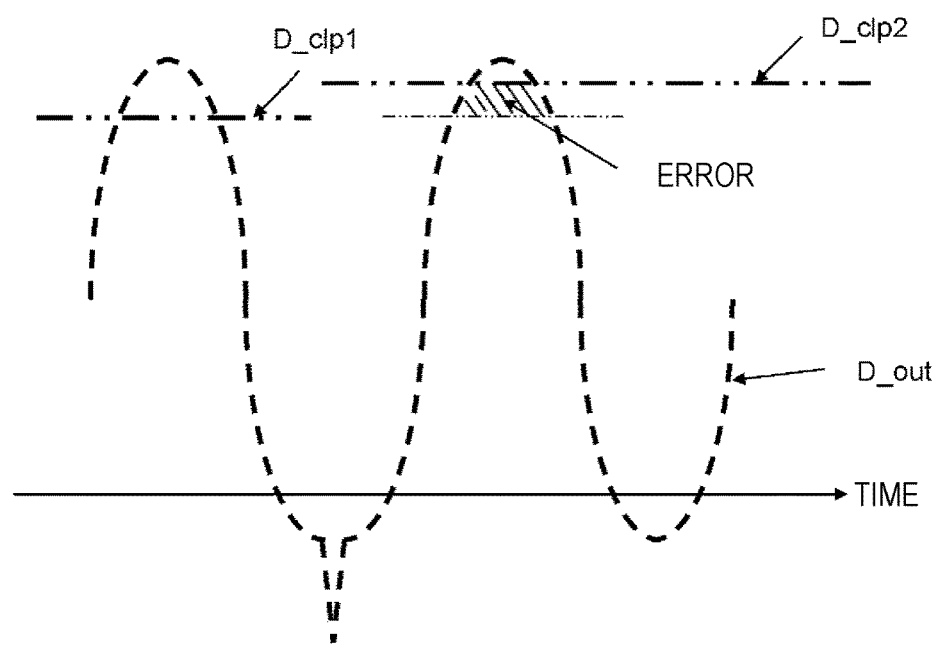
FIG. 16B is a diagram for describing the clamp correction error caused by the mixing of the noise in the input waveform.
Figure 17:
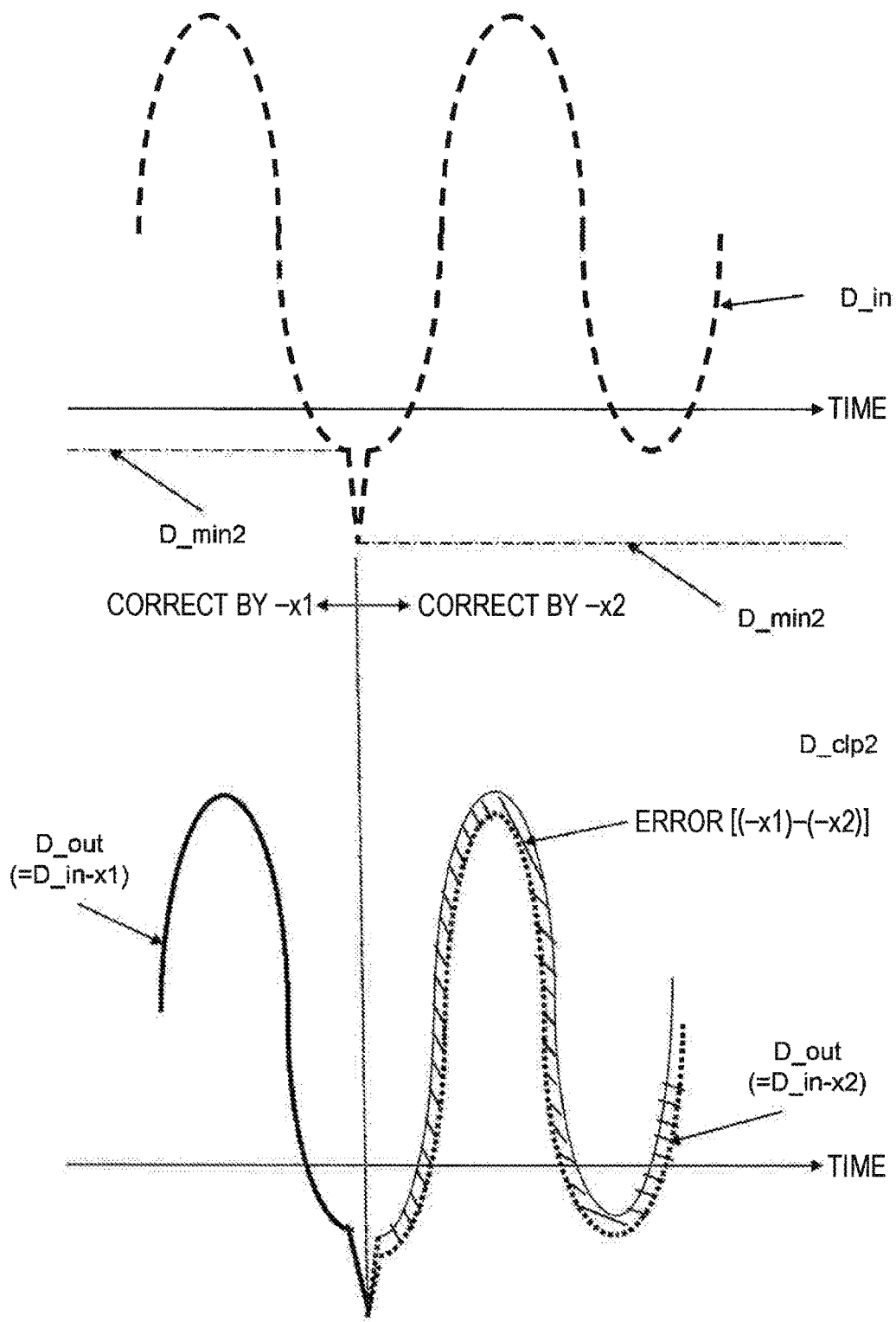
FIG. 17 is a diagram for describing how the flow rate correction value is changed before and after the noise is mixed in the input waveform, and describing the addition-system correction error by the mixing of the noise in the input waveform.

Next, description is made of the advantage of clamping the waveform in this example. Methods of correcting the waveform are roughly classified into two kinds: a method of cutting a part of the waveform, like clamping, for the correction; and a method of adding the amount of correction to the waveform for the correction. Both are considered as the effective correction method in the case of correcting the normal rippling waveform. The engine rippling, however, does not always have the stable rippling waveform and sometimes has a noise. FIGS. 16(a), 16(b), and 17 show the correction waveform when the noise has mixed.

First, description is made of the method of clamping for the correction with reference to FIGS. 16(a) and 16(b).

FIG. 16(a) shows the waveform when the noise has mixed in the element output (D_in), and the minimum value detected in the LSI at this time is different before and after the noise is mixed. Thus, the value with a different clamp value (D_clp2) is applied. However, if the correction is made with the clamping, the original waveform is maintained unless the original waveform exceeds the clamp value; therefore, the error occurs only within a portion. The output waveform is D_out in FIG. 17(b).

In contrast to this, the method of adding the correction amount is described with reference to FIG. 17. FIG. 17 show the waveform in the case where the noise has mixed in the element output (D_in) similarly, and the minimum value detected in the LSI at this time is different before and after the noise is mixed. Thus, the value with a different clamp value (−x2) is applied. As FIG. 17 show the output waveform in the case where the correction amount is added, the error [(−x1)−(−x2)] is normally generated in the entire waveforms because the correction amount is constantly added, in which case the correction accuracy may be deteriorated.

In the case where the noise is mixed in the waveform, therefore, the method of clamping for the correction allows smaller correction error.

In this example, the mountain part of the rippling waveform is clamped for reducing the rich error as illustrated in FIG. 6. Similarly, it is clear that the lean error can be reduced if the valley part of the rippling waveform is clamped for reducing the lean error.

As thus described, even in the engine environment representing the VTC engine for the purpose of improving the fuel efficiency, where the high ripple amplitude is generated, the thermal flow sensor with the suppressed ripple error of the output signal and the improved correction accuracy against the noise can be provided.

EXAMPLE 2

Next, another structure example of the present invention is described.

Figure 10A:
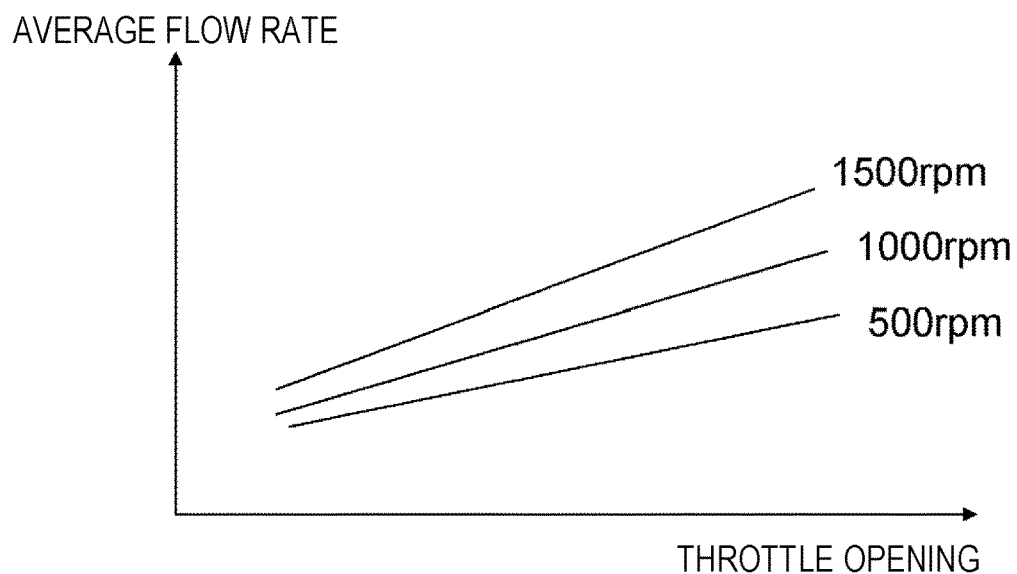
Figure 10B:
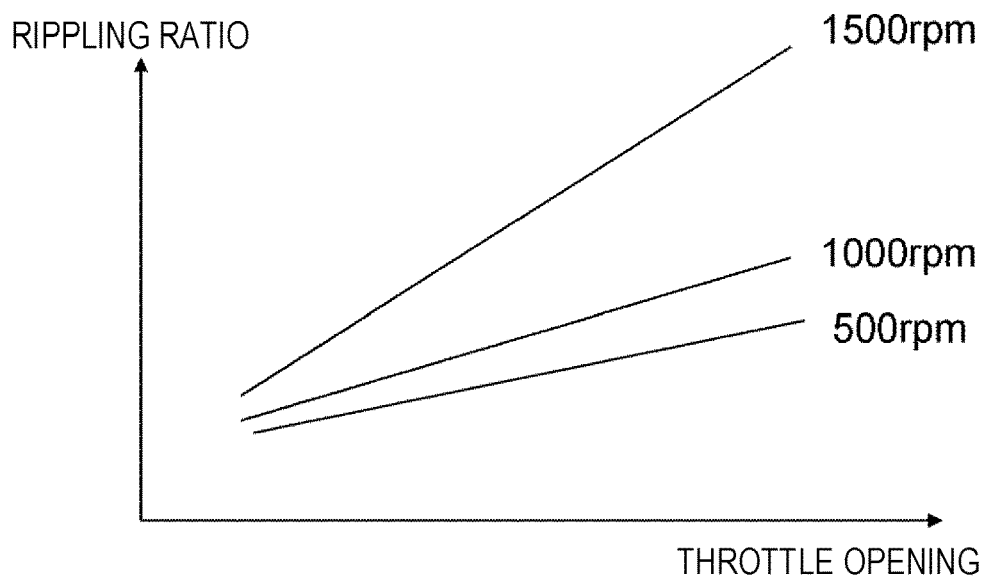

First, description is made of determining the clamp correction value on the basis of two parameters of the average flow rate and the amplitude value. With reference to FIGS. 10(a) and 10(b), the rippling behavior in the actual vehicle engine is described. FIG. 10(a) is a graph simply representing the opening of a throttle valve and the average value of the rippling of the air flowing at that time. As the throttle opening is increased, the average flow rate in the duct is increased. The average flow rate depends on the engine speed. The engine speed directly depends on the frequency of the rippling waveform.

Next, FIG. 10(b) is a graph simply representing the opening of the throttle valve and the ripple amplitude ratio of the air rippling at that time. The ripple amplitude ratio is calculated by the following formula (1).

$$\text{(Ripple amplitude ratio)}=\text{(ripple amplitude amount)}/\text{(average flow rate)} \quad (1)$$

As FIG. 10(b) indicates, the ripple amplitude ratio of the air rippling is increased as the throttle opening is increased. The average flow rate depends on the engine speed at that time Thus, the air rippling in the actual vehicle engine is the physical, phenomenon depending on the "frequency", "average flow rate", and "ripple amplitude ratio (ripple amplitude amount)". Based on the combination among these three parameters, the error of the flowmeter is determined. That is to say, as long as the parameters can be accurately read in the correction LSI inside the sensor at each rippling condition, the correction in accordance with the parameters can be made.

However, to have the three parameters means to have the correction values three-dimensionally. In this case, the correction value map and the calculation step inside the correction LSI becomes necessary excessively, which increases the cost.

Figure 11:
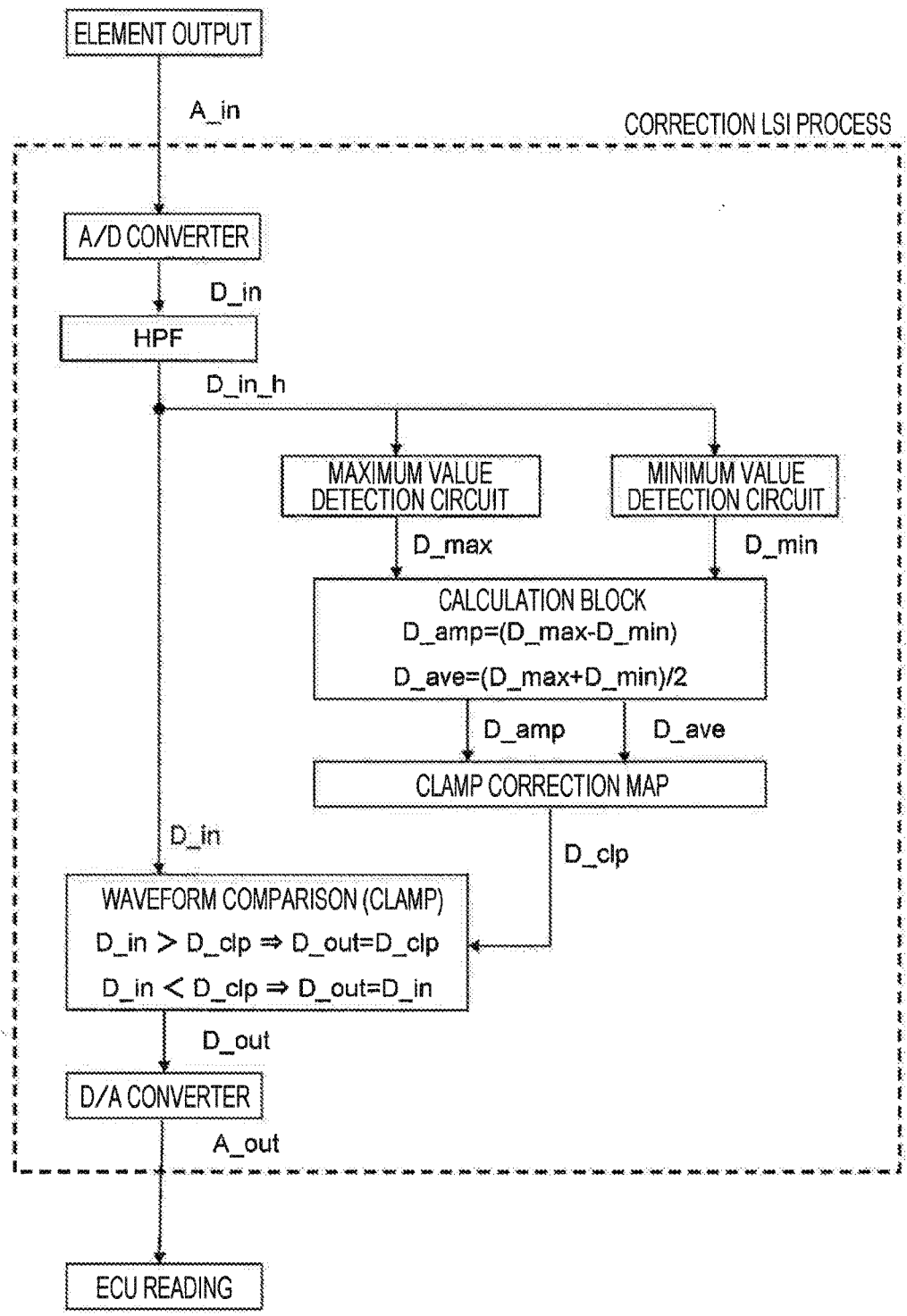
Figure 12:
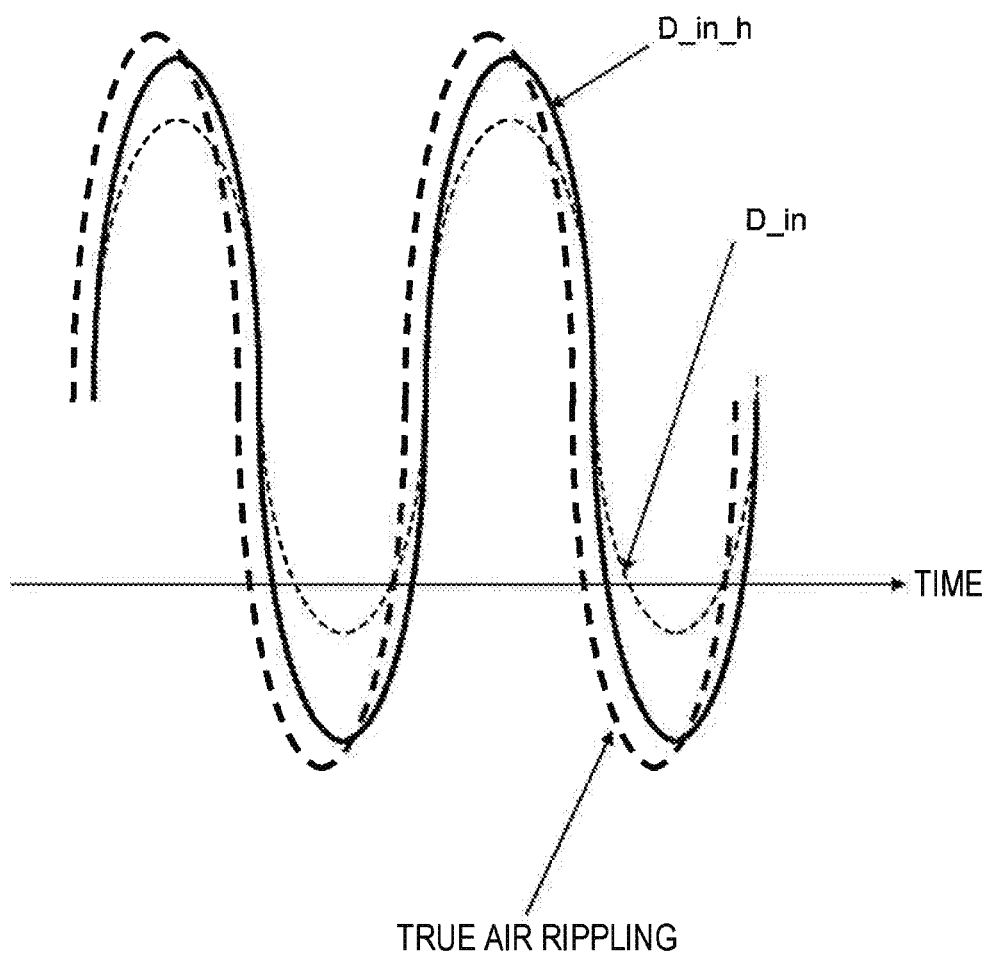
FIG. 12 is an explanatory view of the waveform after the HPF correction in the present invention.

In view of this, the authors have tried to improve the correction accuracy and reduce the cost of the LSI by combining the frequency response compensation such as HPF (high pass filter) and the above correction (FIG. 7). This structure is illustrated in FIG. 11.

The point different from FIG. 7 is that the correcting process with the HPF is carried out after the A/D conversion in the A/D converter. Through the correcting process with the HPF, the correction is made so that the output waveform (output amplitude) attenuated by the response delay gets closer to the true air ripple amplitude. This solves the lean error caused by the response delay depending on the frequency. Namely, the dependency of "frequency" as one of the three parameters on the ripple error is reduced. This enables the rippling correction with higher accuracy if the corrections in accordance with the other parameters, "average flow rate" and "ripple amplitude amount" are applied to the input signal. The clamp correction value necessary for the correction is reduced from the three-dimensional map to the two-dimensional map, so that the cost increase of the LSI is improved.

Moreover, in this example, the clamp correction value is determined using the detected average value and ripple amplitude amount as the parameters; therefore, in the DC waveform where the rippling is not caused, the amplitude amount becomes substantially zero. If the amplitude amount is as small as zero, the clamp correction value is set to be a much larger value. This can omit the correction and the influence on the static characteristic can be made zero. That is to say, the present correction is featured in that under the static characteristic condition where the correction is not necessary, the correction influence can be eliminated and the correction is applied only under the dynamic characteristic condition where the correction is necessary.

Moreover, this example has the frequency response compensation typified by HPF and the like for reducing the frequency dependency. However, if the lean error due to the response delay does not need to be corrected by the method of reducing the ripple error due to the bypass structure typified by the inertial effect or the like, the correcting method as illustrated in FIG. 7 can be used for the rippling correction.

EXAMPLE 3

Figure 13:
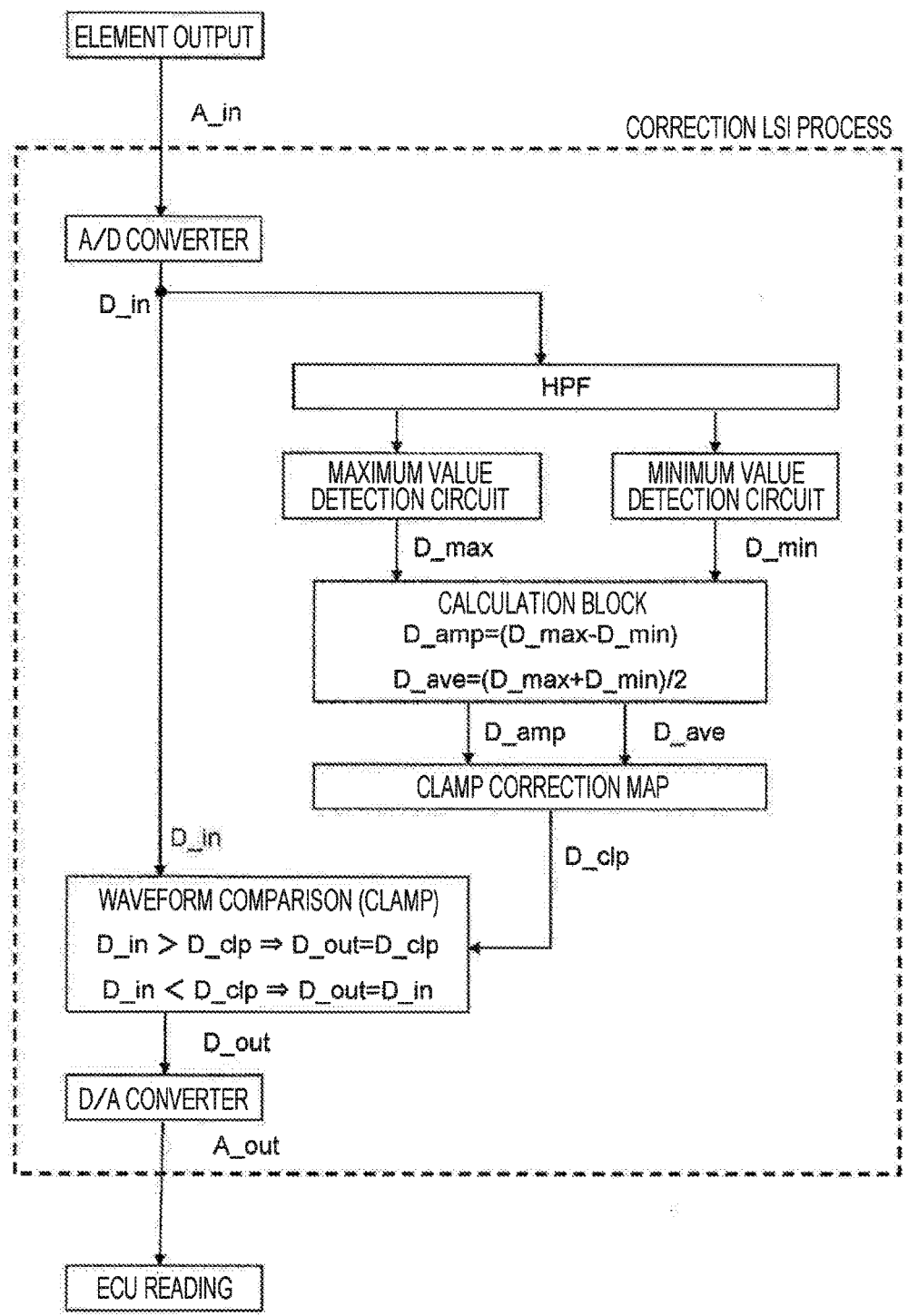
FIG. 13 is an explanatory view in one embodiment of the correcting method in the present invention.

Note that although the error is reduced by the bypass structure, the waveform of the element output at the high-frequency rippling remains to be the waveform attenuated from the true ripple amplitude amount due to the response delay. In this case, the maximum value and the minimum value of the waveform may not be accurately recognized and the correction in accordance with the rippling condition may be failed. Description is made of a structure of an example of the correction method for solving this with reference to FIG. 13.

It is necessary to prevent the ripple error from being enriched by not having the input signal subjected to the HPF correction and to detect the values close to the true ripple amplitude amount for the maximum value and the minimum value of the waveform. Therefore, by having only the input of the detected maximum value and minimum value through the HPF, the attenuation of the waveform is improved and the peak values can be recognized more accurately. This leads to the accurate recognition of the rippling condition, and thus enables the highly accurate correction.

Thus, the highly accurate thermal flow sensor with the rich error suppressed in the high rippling region as illustrated in FIG. 6 can be provided.

EXAMPLE 4

One structure example of more accurately recognizing the values detected in the maximum value and minimum value detection circuits relative to the correcting method as above will be described with reference to FIG. 14.

Figure 14:
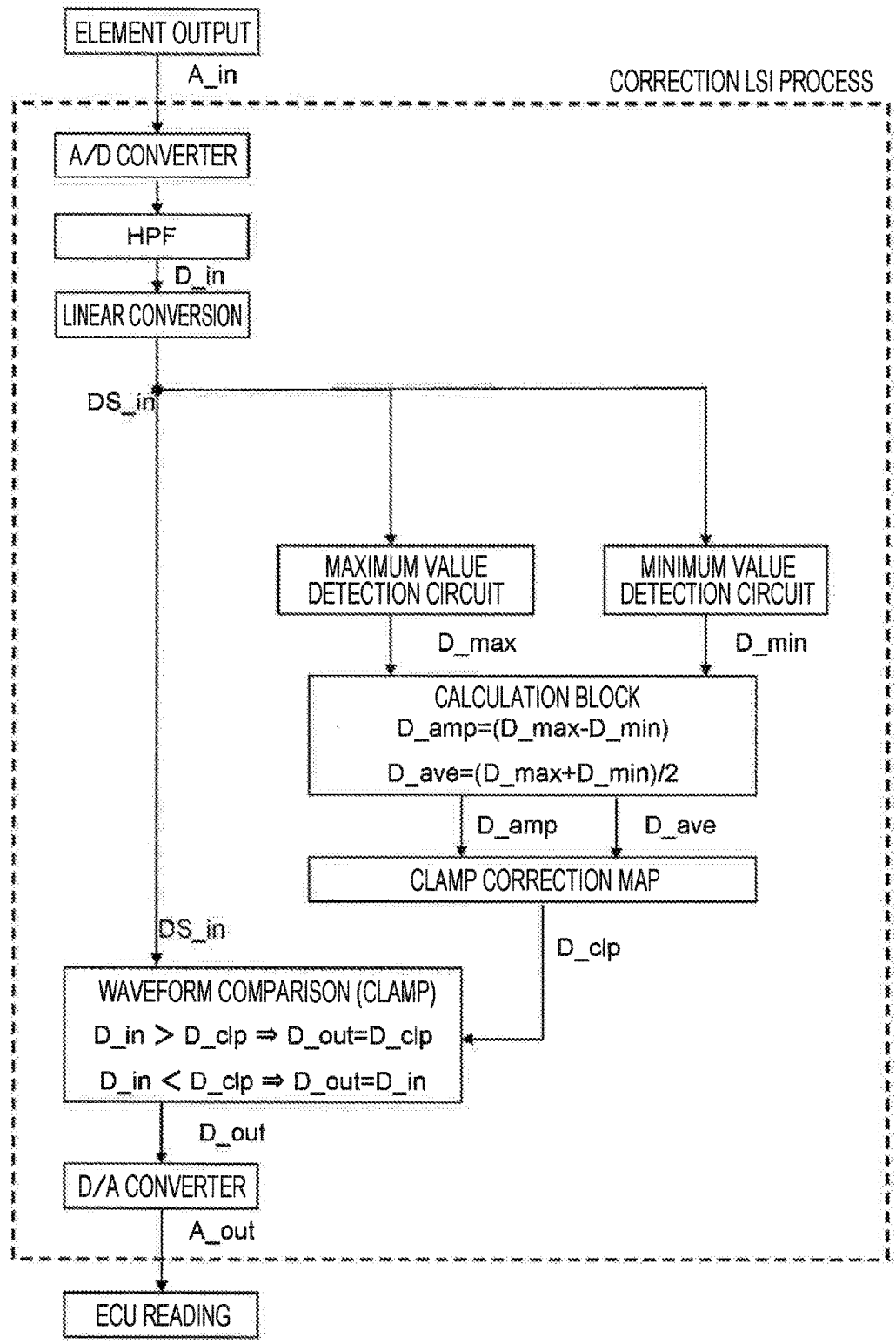
FIG. 14 is an explanatory view in one embodiment of the correcting method in the present invention.

FIG. 14 is based on the correcting method of Example 2 and this similarly applies to the other examples. As illustrated in FIG. 14, in this example, the signal after being subjected to the response delay compensation with the HPF is corrected in the linear conversion circuit. This correction will be described specifically with reference to FIG. 15.

The output of the sensor element 20 is in the nonlinear curve relation with the air flow rate as illustrated in FIG. 15. Therefore, the output value (D_in) without the curve correction has the characteristic with the curve as shown in the drawing. In this case, if the amplitude amount (Qa) of the rippling waveform is the same and the average flow rate is different, the amplitude amount (Va) is detected as different values in the LSI, so that the accuracy of the correction is deteriorated.

If the linear conversion correction is carried out for this, the amplitude amount can be detected accurately even though the average flow rate of the rippling waveform has changed. This enables the highly accurate correction.

REFERENCE SIGNS LIST

10 silicon substrate
11 multilayer film of insulator and resistor
12 diaphragm
13 heater
14 upstream side temperature resistor
15 downstream side temperature resistor
16 intermediate potential
20 sensing element
25 support substrate
30 housing member
40 air intake duct

The invention claimed is:

1. A thermal flow sensor, comprising:
    an air flow rate detection element with a diaphragm having a thin-film portion in a semiconductor substrate;
    at least one heat generating resistor on the diaphragm;
    at least one temperature measuring resistor that detects temperature on each of an upstream side and a downstream side of the heat generating resistor; and
    a correction circuit, including a maximum value detection circuit and a minimum value detection circuit, configured to process an output signal of the air flow rate detection element based on temperature difference information of at least the two temperature measuring resistors on the upstream side and the downstream side,
    wherein the correction circuit is configured to cut off a part of a mountain part or a valley part constituting a peak value of a waveform of the output signal by outputting an arbitrary predetermined value that is determined based on maximum and minimum values determined by the maximum and minimum value detection circuits, respectively, when the peak value of the waveform exceeds the arbitrary predetermined value.

2. The thermal flow sensor according to claim 1, wherein the arbitrary predetermined value is determined from two parameters of an amplitude value and an average flow rate obtained from signals based on the output signal of the air flow rate detection element.

3. The thermal flow sensor according to claim 2, wherein the average flow rate and the amplitude value are obtained from signals based on the output signal of the air flow rate detection element using values detected from the maximum value detection circuit and the minimum value detection circuit.

4. The thermal flow sensor according to claim 3, wherein the signals based on the output signal of the air flow rate detection element is a signal corrected by a circuit that compensates response delay of the output signal of the air flow rate detection element.

5. The thermal flow sensor according to claim 3, wherein the output signal is subjected to a correcting process by a frequency response circuit.

6. The thermal flow sensor according to claim 3, wherein the signal input to the circuit that detects the maximum value and the circuit that detects the minimum value is the signal obtained by correcting the output signal in a linear direction based on a relation between a flow rate and an output.

* * * * *